(12) United States Patent
Babu et al.

(10) Patent No.: US 9,385,818 B2
(45) Date of Patent: Jul. 5, 2016

(54) HANDLING OF SIGNALS TRANSMITTED THROUGH A HUMAN BODY

(75) Inventors: Bibin Babu, Kista (SE); Kiran Kariyannavar, Kista (SE); Dilip Kumar Vajravelu, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/372,769

(22) PCT Filed: Jan. 23, 2012

(86) PCT No.: PCT/SE2012/050058
§ 371 (c)(1),
(2), (4) Date: Jul. 17, 2014

(87) PCT Pub. No.: WO2013/112080
PCT Pub. Date: Aug. 1, 2013

(65) Prior Publication Data
US 2014/0348270 A1   Nov. 27, 2014

(51) Int. Cl.
*H04B 3/46*        (2015.01)
*H04B 17/00*       (2015.01)
(Continued)

(52) U.S. Cl.
CPC ............. *H04B 13/005* (2013.01); *H04B 13/00* (2013.01); *H04L 7/041* (2013.01)

(58) Field of Classification Search
CPC . H04B 13/005; A61B 5/0002; G07C 9/00111
USPC .................. 375/224, 130, 142, 259, 285, 354; 341/61
See application file for complete search history.

(56) References Cited

U.S. PATENT DOCUMENTS 6,223,018 B1 * 4/2001 Fukumoto ............... H04B 5/00
                                                    379/55.1
6,944,577 B1     9/2005 Mauer et al.
(Continued)

FOREIGN PATENT DOCUMENTS

EP      1 102 215        5/2001
EP      1102215  A2 *    5/2001
(Continued)

OTHER PUBLICATIONS

Notification of Transmittal of the International Search Report and the Written Opinion of the International Searching Authority, or the Declaration for International Application No. PCT/SE2012/050058, Feb. 11, 2013.

(Continued)

*Primary Examiner* — Sam K Ahn
*Assistant Examiner* — Fabricio R Murillo Garcia
(74) *Attorney, Agent, or Firm* — Baker Botts, LLP

(57) ABSTRACT

A signal handling device for handling a signal transmitted through a body, where the signal is coded with a coding scheme and associated clock rate, comprises a receiving unit configured to receive the signal, a signal sampler configured to sample at least a section of the signal with a sample rate that is higher than the clock rate of the coding scheme and form at least one series of samples of the signal, where the samples of a series have been sampled at a sampling position periodically recurring according to the clock rate, and a data analyzer configured to investigate if said at least one series fulfills a data sequence detection criterion, and set a sampling position for which a series of samples fulfills the data sequence detection criterion to be an operative sampling position.

21 Claims, 6 Drawing Sheets

(51) Int. Cl.
*H04Q 1/20* (2006.01)
*H04B 13/00* (2006.01)
*H04L 7/04* (2006.01)

(56) References Cited

U.S. PATENT DOCUMENTS

| | | | |
|---|---|---|---|
| 7,532,645 | B1 | 5/2009 | Bataineh et al. |
| 8,467,431 | B2 * | 6/2013 | Park et al. .................... 375/146 |
| 2005/0192488 | A1 * | 9/2005 | Bryenton ........... A61B 5/02055 |
| | | | 600/301 |
| 2008/0193125 | A1 * | 8/2008 | Weber et al. .................... 398/25 |
| 2009/0233548 | A1 * | 9/2009 | Andersson ........... H04B 13/005 |
| | | | 455/41.2 |
| 2010/0090876 | A1 * | 4/2010 | Taft et al. ....................... 341/166 |
| 2010/0103000 | A1 * | 4/2010 | Ferchland et al. ............... 341/61 |
| 2010/0272156 | A1 * | 10/2010 | Park et al. ..................... 375/142 |
| 2010/0315206 | A1 * | 12/2010 | Schenk ................ H04B 13/005 |
| | | | 340/286.01 |
| 2011/0087940 | A1 * | 4/2011 | Whetsel ........................ 714/727 |

FOREIGN PATENT DOCUMENTS

| | | |
|---|---|---|
| WO | WO 2009/075420 | 6/2009 |
| WO | WO 2009/081343 | 7/2009 |
| WO | WO 2010/042066 | 4/2010 |
| WO | WO 2010/122444 | 10/2010 |

OTHER PUBLICATIONS

"The Human Body Characteristics as a Signal Transmission Medium for Intrabody Communication" by Namjun Cho et al, 2007.
European Patent Office, Munich, Germany; Application No. 12866860.5-1860 / 2807769 PCT /SE2012050058, Ref. No. P36137 EP1; Communication regarding Supplementary European Search Report, dated Sep. 8, 2015, 7 pages.

* cited by examiner

HANDLING OF SIGNALS TRANSMITTED THROUGH A HUMAN BODY

PRIORITY

This nonprovisional application is a U.S. National Stage Filing under 35 U.S.C. §371 of International Patent Application Serial No. PCT/SE2012/050058, filed Jan. 23, 2012 and entitled "Handling of Signals Transmitted Through A Human Body."

TECHNICAL FIELD

The invention relates to communication using a body as a communication channel. More particularly, the invention relates to a method of handling a signal transmitted through a body as well as to a signal handling device.

BACKGROUND

Human Body Communication is an area that has received interest in recent years. Human Body Communication essentially involves using the body as a physical communication layer between two communicating entities.

Human body communication has for instance been investigated by T. Zimmerman in "Personal Area Network (PAN): Near-Field Intra-Body Communication" Master's Thesis MIT Media Laboratory, September 1995.

The body is as such a medium that differs from person to person. This medium is furthermore heavily influenced by the environment in which it is provided, such as the shoes worn by a person the body of which is used and any metal objects in the vicinity of the body.

This makes it hard to decode signals transmitted through a body.

There is thus a need for improvement in the handling of signals that have been transmitted through a body.

SUMMARY

The invention is therefore directed towards providing an improved and more flexible way in which signals are handled after transmission through a body.

This object is according to a first aspect of the invention achieved through a method of handling a signal transmitted through a body, where the signal is coded with a coding scheme and associated clock rate. The method is performed in a signal handling device and comprises:
receiving the signal,
sampling at least a section of the signal with a sample rate that is higher than the clock rate of the coding scheme,
forming at least one series of samples of the signal, where the samples of a series have been sampled at a sampling position periodically recurring according to the clock rate,
investigating if the at least one series fulfils a data sequence detection criterion, and
setting a sampling position for which a series of samples fulfils the data sequence detection criterion to be an operative sampling position.

This object is according to a second aspect achieved by a signal handling device for handling a signal transmitted through a body, where the signal is coded with a coding scheme and associated clock rate. The signal handling device comprises:

a receiving unit that receives the signal,
a signal sampler that
samples at least a section of the signal with a sample rate that is higher than the clock rate of the coding scheme, and
forms at least one series of samples of the signal, where the samples of a series have been sampled at a sampling position periodically recurring according to the clock rate, and
a data analyser that
investigates if the at least one series fulfils a data sequence detection criterion, and
sets a sampling position for which a series of samples fulfils the data sequence detection criterion to be an operative sampling position.

The invention has a number of advantages. It allows the sampling of the signal to be adapted to the specific conditions of the body through which it is transmitted. It can with advantage be used for narrowband signals with distorted duty cycles. This can also be combined with receiving of signals with fast rates and at low power levels.

According to a first variation of the first aspect, the investigating involves determining the quality of reception of a known data sequence.

According to a first variation of the second aspect, the data analyser, when investigating a series, determines the quality of reception of a known data sequence.

According to a second variation of the first aspect, the forming involves forming more than one series of samples and the sampling positions of each series differ from each other.

According to a second variation of the second aspect, the signal sampler forms more than one series of samples, where the sampling positions of each series differ from each other.

According to a third variation of the first and second aspects, only one series fulfils the data sequence detection criterion. The series may furthermore be the series which has the highest quality of reception of the known data sequence.

According to a fourth variation of the first aspect, the investigating involves investigating one series of samples at a time, and the setting involves setting a sampling position to be an operative sampling position if the corresponding series fulfils the data sequence detection criterion and otherwise repeating investigating series of samples until the data sequence detection criterion is fulfilled.

According to a fourth variation of the second aspect, the data analyser investigates one series of samples at a time and sets a sampling position to be an operative sampling position if the corresponding series fulfils the data sequence detection criterion and otherwise repeats investigating series of samples until the data sequence detection criterion is fulfilled.

According to a fifth variation of the first aspect, the method further comprises obtaining symbols in the signal from signal samples obtained at the operative sampling position.

According to a fifth variation of the second aspect, the signal sampler further obtains symbols in the signal from signal samples obtained at the operative sampling position.

According to a sixth variation of the first aspect, the method further comprises extracting user data from the obtained symbols.

According to a sixth variation of the second aspect, the signal handing device further comprises a decoding unit that extracts user data from the obtained symbols.

According to a seventh variation of the first aspect, the extracting comprises performing a logical operation on the symbols for obtaining user data.

According to a seventh variation of the second aspect, the decoding unit performs a logical operation on the symbols for obtaining user data.

According to an eighth variation of the first aspect, the method further comprises investigating if a received signal comprises pulses and adjusting the amplitude of the signal until pulses are detected.

According to an eighth variation of the second aspect, the signal handling device further comprises an amplifier and a pulse investigator. According to this variation, the pulse investigator investigates if a received signal comprises a pulse and adjusts the gain of the amplifier until pulses are detected.

According to a ninth variation of the first and second aspects, the signal is a Manchester encoded signal.

According to a tenth variation of the first and second aspects, the frequency band of the signal lies between 1-100 MHz, where the signal may be provided in one of two bands provided in the range.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention concerns human body communication, i.e. when a body, for instance a human body, is used as medium over which signals are being transmitted.

The functioning of the body as a medium and how transmissions can be made through it has been described in some detail by T. Zimmerman in "Personal Area Network (PAN): Near-Field Intra-Body Communication" Master's Thesis MIT Media Laboratory, September 1995, which is herein incorporated by reference.

In short the body can be modelled using a combination of resistors and capacitors connected between a transmitter, receiver and ground. Based on various external conditions as well as the properties of the specific body these values of the resistors and capacitors can vary considerably.

Figure 1:
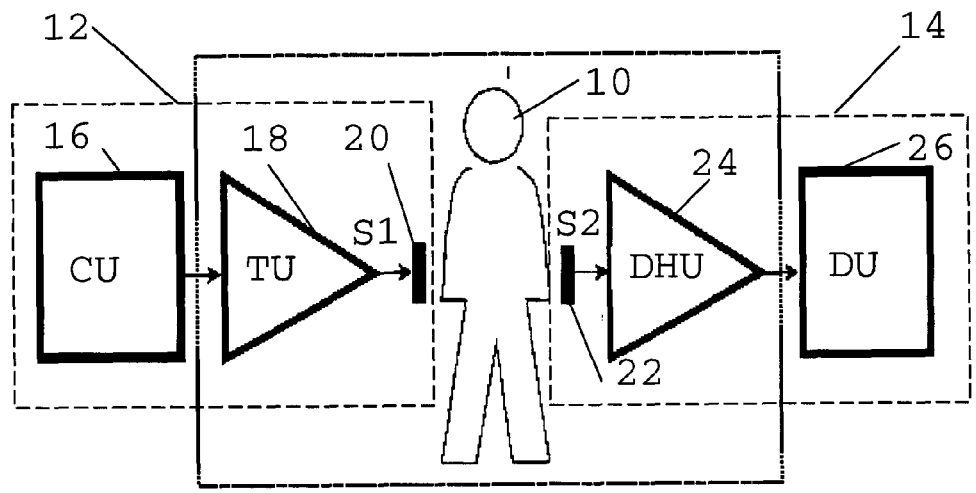
FIG. 1 schematically shows a body signal transmission device and a signal handling device communicating via a human body.

FIG. 1 schematically shows a body signal transmission device 12 connected to a first side of a human body 10, where a signal handling device 14 is connected to a second side of the human body.

The body signal transmission device here comprises a coding unit 16 connected to the input of a transmitting unit 18, the output of which is connected to a first electrode 20 provided at the first side of the body, for instance at a first hand.

The signal handling device 14 here comprises a second electrode 22 provided at the second side of the body, for instance at a second hand. The second electrode 22, which is a receiving unit of the signal handling device, is in turn connected to the input of a data handling unit 24, the output of which is connected to a decoding unit 26. The electrodes 20 and 22 may here be capacitive coupling electrodes, i.e. electrodes capacitively coupled to the body in case a capacitive communication is to be provided. They may also be galvanically coupled to the body in case galvanic communication is needed. In the first case there is a gap between the electrode and the body, for instance a gap of air, while in the second case the electrode is in direct or galvanic contact with the body 10. The type of connection used may here depend on the conditions under which the body is provided or supposed to be used as a medium as well as on if DC currents are to be avoided or not. In FIG. 1 there is also shown a signal S1 being provided to the first electrode 20 for transfer to the signal handling device 14 and the signal S2 after transmission through the body 10 and reception at the second electrode 22.

The coding unit 16 may here be provided in the form of a digital baseband transmitter that codes data using a coding scheme, such as a Manchester coding and provides the coded data to the transmitting unit 18 for transmission. It should here also be known that in addition to Manchester coding additional error recovery and/or identification coding can be carried out such as Cyclic Redundancy Check (CRC) coding. The transmitting unit 18 may for example include a line driver and voltage doubler supplying the voltage to line driver or any other component that can drive the electrode at required voltage based on the output from digital coding unit.

Figure 2:
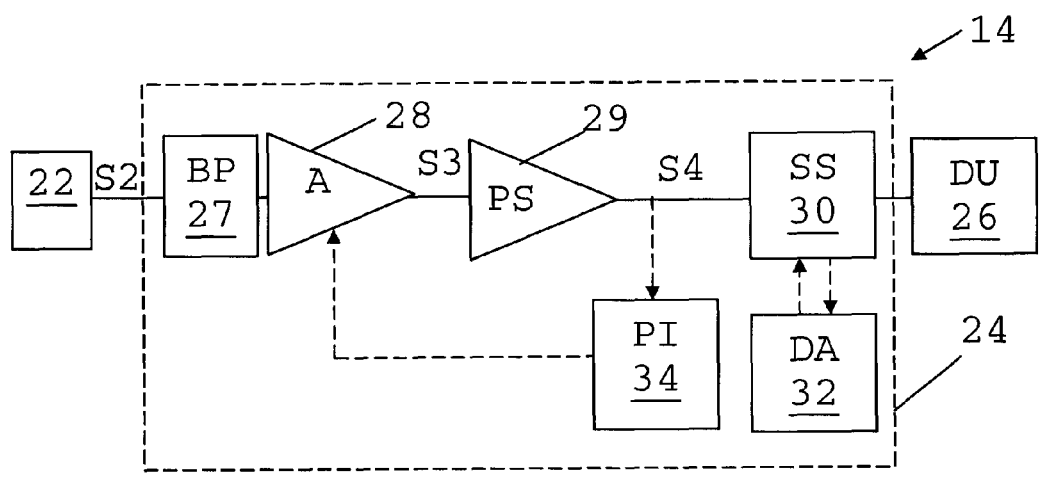
FIG. 2 shows a simplified block schematic of the signal handling device in FIG. 1, FIG. 3 schematically shows the structure of a signal being transmitted through the body, FIG. 4 schematically shows a part of the signal shown in FIG. 3 when it is being transmitted by the body signal transmission device, when it is received by the signal handling device and when it is being processed by the signal handling device.

FIG. 2 shows a block schematic of one variation of the signal handling device 14 that shows the various elements of the data handling unit 24 in more detail. The second electrode 22 is connected to an input of a filter 27, here a bandpass filter BP. The filter has an output connected to an input of a signal input of an analog amplifier A 28, such as an operational amplifier, the signal output of which is connected to a pulse shaper PS 29, here in the form of a Schmitt trigger. The output of the pulse shaper 29 is connected to a signal input of a signal sampler SS 30, the signal output of which is connected to an input of the decoding unit DU 26. There is also a data analyser DA 32 connected to the signal sampler 30 for exchanging data with the signal sampler 30. There is furthermore a pulse investigator PI 34 that is connected to the output of the pulse shaper 29 and providing a signal to an amplification adjusting input of the amplifier 28. It should here be realized that it is possible with more amplifiers and pulse shapers in the data handing unit 24. It is also possible to provide the data handling unit without amplifiers and pulse shapers. It is also possible to omit the filter 27. In the figure there is also shown the previously mentioned signal after reception at the second electrode S2, after amplification S3 as well as after pulse shaping S4.

Figure 3:
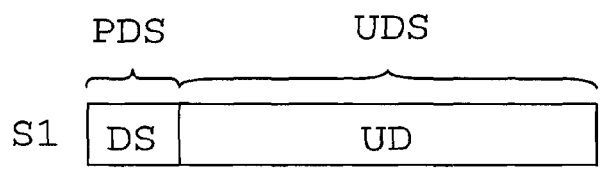

FIG. 3 schematically shows how the signal S1 comprises a pilot data section PDS and a user data section UDS. In the pilot data section PDS there is provided a known data sequence DS of symbols, i.e. a pilot sequence that may be a sequence of binary symbols, while the user data section UDS comprises user data UD, for instance data according to some type of user application, like messaging, audio or file transfer data. The data may thus be data used in a mobile communication session involving a cellular terminal or user equipment. In fact either the signal handling device or the body signal transmission device may be a part of or communicating with a user equipment in a wireless communication network, such as Long Term Evolution (LTE) and/or Wideband Code Division Multiple Access (WCDMA).

It should here be realized that such a signal may comprise several regularly repeated pilot data sections PDS interspersed with user data sections UDS.

Figure 4:
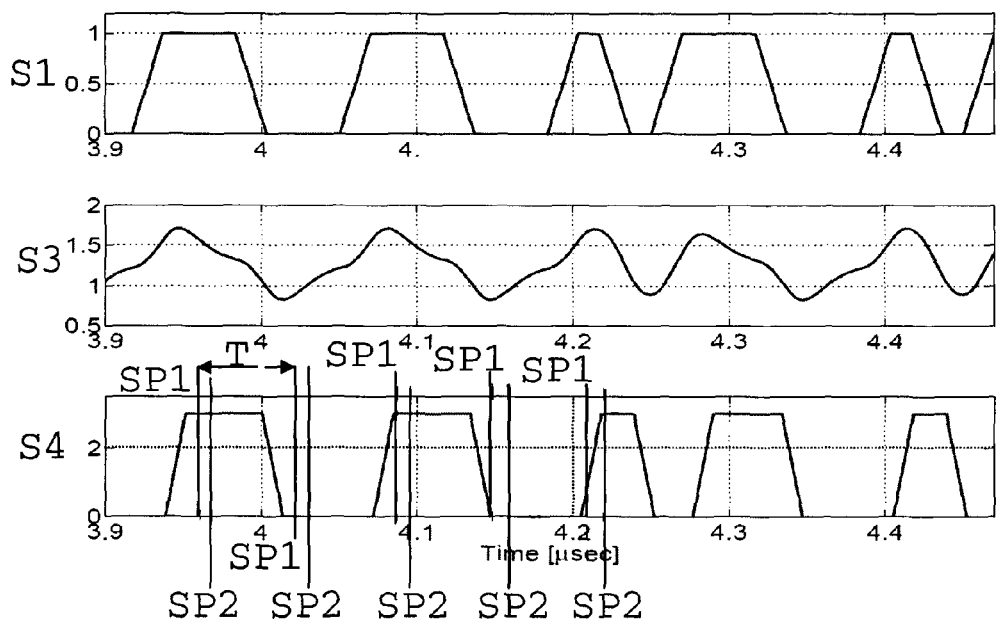

FIG. 4 schematically shows the shape of a part of the above mentioned signal when being transmitted S1 from the body signal transmission device before entering the body, after amplification S3 in the amplifier of the data handling unit and finally the same signal after pulse shaping S4 in the pulse shaper of the same data handling unit. In the last version of the signal S4 there is also shown a clock period T associated with the clock rate used at the body signal transmission device as well as sampling positions SP1 and SP2 of a sample rate that is higher than the clock rate. The higher sample rate is typically n times higher where n may be an integer, such as 2, 3, 4, 5, 6, 7, 8, 9 or 10, i.e. in the range between 2 and 10. It should however be realized that higher sample rates are also possible such as sample rates that are 100 times higher than the clock rate.

Figure 5:
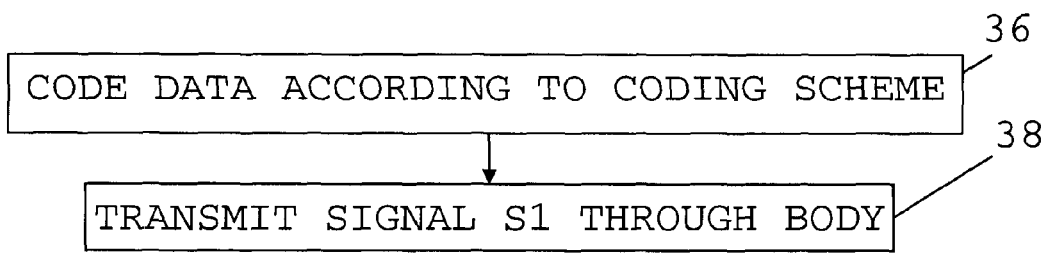
FIG. 5 shows method steps in a method for transmitting a signal being carried out by the body signal transmission device.
Figure 6:
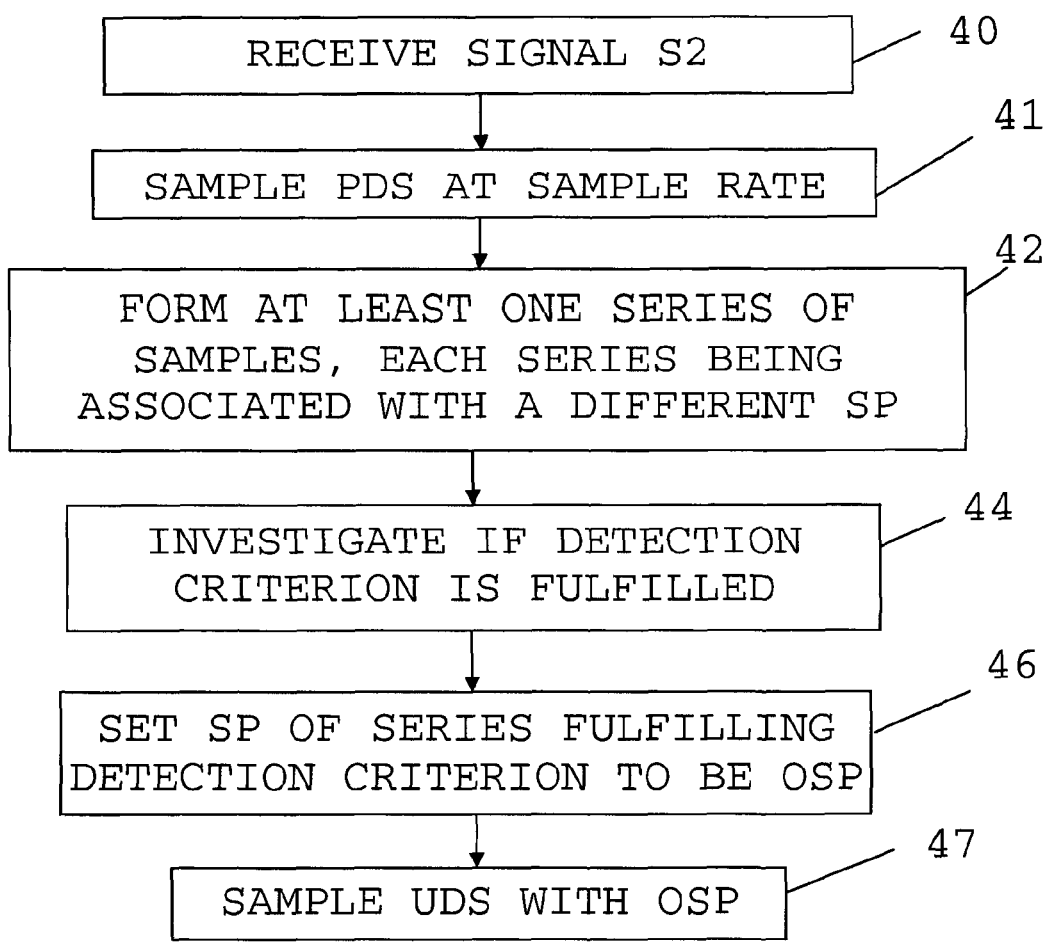
FIG. 6 shows a number of method steps in a method of handling a signal according to a first embodiment of the invention being performed in the signal handling device.

A first general embodiment of the invention will now be described with reference also being made to FIGS. 5 and 6, where FIG. 5 shows a flow chart of a number of method steps in a method for transmitting a signal being carried out by the body signal transmission device 12 and FIG. 6 shows a flow chart of a number of method steps in the handling of a signal being performed in the signal handling device 14.

A signal transmitted through a body is influenced both by the specific body used as well as by different varying factors of the environment in which the body is provided. These influences typically distort the signal. The signal can thus be affected by the properties of the specific human body through which it propagates as well as by different temporary external influences. The communication link through the human body may therefore have drastically varying channel properties. The physical aspects causing this variation comprise the size of the person(s) involved as channel, humidity of the environment, length of channel (human body), dielectric property of the shoes worn by the person acting as channel, floor/ ground type where the communication is occurring, presence of any metallic body near to the channel etc. These factors may have a big influence on the signal, which is typically impossible to predict. Also components in the signal handling device, such as the filter 27, may influence the properties of the signal. These factors all make the signal hard to decode. The human body channel along with the filter, which is introduced to select a narrow frequency band for communication, therefore introduces variation in phase and frequency response of the channel. This causes phase jitter in the encoded signal, which in turn distorts the duty cycle which is hard to handle by the traditional way of decoding.

Therefore it is important that the handling of the signal in the signal handling device is flexible enough for enabling a good detection of the symbols that are provided in the signal, such as binary symbols, despite these potential problems. At the same time there is a need for a small bandwidth in order to avoid the signal to be interfered by and cause interference to other signals. Also low power levels are often desirable. This means that the identification of symbols in the signal may be problematic. One aspect of the invention is directed towards providing a solution to this problem.

According to the first embodiment, a signal is first coded according to a coding scheme in the coding unit 16 of the body signal transmission device 12, step 36. The coding may here comprise coding data with a scheme such as the Manchester coding scheme. This may be performed through applying a logical exclusive-or operation on the data and a clock signal. The clock signal may here have a clock rate that depends on the frequency band used. It may for instance be 10 or 40 Mbit/s. Furthermore the data may comprise a CRC code. The signal may more particularly be a signal according to FIG. 3 with a pilot data section PDS comprising a data sequence of known data symbols, i.e. symbols that are known by the signal handling device 14 followed by a user data section UDS comprising user data UD for instance user data in one application in which a user is interested. This user may be a user, through the body of which the signal S1 is to be transmitted. The signal is with advantage provided in one of two frequency bands, such 5-10 MHZ or 20-40 MHz and with advantage in the range 1-100 MHz.

The signal format may furthermore have a packet structure according to the Ethernet standard IEEE 802.3. The signal may because of this be provided in the form of one or more logical packets comprising a preamble (62-bit), delimiter (2-bit), source and destination address field (8-bit), length field (16-bit), raw data and CRC (16-bit). It should be realized that the numbers of bits indicated in parenthesis above are only exemplifying. Both the pilot data section PDS and the user data section may be provided through the payload UDS, i.e. as the raw data section of one or more data packets.

As can be seen above, the packets may have variable size, where the packet size is indicated in the length field. The length field may indicate how many bytes in total are packed in each packet. A length field can as an example have a minimum value of 6 bytes for a header of 3-byte, a payload of 1 byte and a CRC check field of 2-byte.

The coded signal is then provided to the transmitting unit 18, which goes on and transmits this signal S1 through the body 10 of the user via the first electrode 20, step 38.

After transmission through the body 10, the signal S2 is then received by the signal handling device 14 via the second electrode 22, step 40, and from there forwarded to the signal sampler 24, which samples at least a section, here the pilot data section PDS, of the signal at a sample rate, step 41. This sample rate is higher than the clock rate of the coding scheme used at the coding unit 16 of the body signal transmission device 12. The signal sampler 30 thus performs an oversampling of the signal. The signal sampler then forms at least one series of samples of the signal, step 42, with the samples of each series being sampled at a sampling position periodically recurring according to the clock rate. Each such series is thus formed of samples sampled at sampling positions set by the clock rate. This means that samples of a series are separated in time by the clock period T. However, if more than one series is collected then the sampling positions of each series differ from each other. A sampling position of one series is thus separated from a neighbouring sampling position of another series by a time interval that is smaller than the clock period.

In FIG. 4 there is shown a first series with sampling positions SP1 and a second series with sampling positions SP2. It can here be seen that the sampling positions SP2 of the second series are displaced from the sampling positions SP1 of the first series. However both series have the periodicity of T and thus the same sample rate is used. The samples are furthermore being collected when the pilot data section PDS of the signal is transmitted and not when the user data section UDS is transmitted.

The samples, or rather the signal levels of the samples, are then analysed in the signal sampler 30 with respect to the identification of a symbol in the signal. Each sample will because of this analysis be considered to represent a symbol of the data sequence. These symbols are then provided to the data analyser 42, which then investigates the symbols obtained via at least one series of samples in relation to the fulfillment of a data detection criterion. The data analyser 32 thus investigates if the at least one series fulfils the data sequence detection criterion, step 44, and the sampling position of a series that fulfils the data detection criterion is set to be an operative sampling position, step 46. The data analyser 32 thus selects a series which fulfils the data detection criterion. The sampling position of the selected series, which may be considered to be a relative sampling position displaced from a nominal sampling position, is thus set to be an operative sampling position, i.e. a position to be used in the decoding of user data UD in the user data section UDS of the signal. The signal sampler 30 thereafter uses this sampling position in the sampling and obtaining of symbols of the signal, step 47, and provides these symbols to the decoding unit 26, which then decodes the user data, perhaps through extracting the user data from the CRC code and clock pulse.

It is here possible that the criterion is based on the bit error rate BER of the detected known data sequence DS in the pilot data section PDS of the signal or based on packet error rate (PER) of the same section. Here PER is the number of bad data packets received to the total number of packets sent by the transmitter and BER is the total number of incorrectly received bits to the total number of transmitted bits. It is furthermore possible that a threshold is used and that a series having a BER or a PER below this threshold fulfils the criterion. It is also possible that only one series fulfils the criterion, for instance the one that has the best or highest quality of reception, such as the series with the lowest BER or PER.

An example of this is given in FIG. 4. In FIG. 4 a transition from a low to a high level indicates a "one" while a transition from a high to a low level indicates a "zero". Furthermore, a voltage level detected at sampling is considered to correspond to the correct symbol value. This leads to the first five symbols being transmitted in FIG. 4 being the symbols 1, 0, 1, 0, 1. It can be seen that five samples are taken at a first sampling position SP1 for forming a first series of samples and that five samples are taken at a second sampling position SP2 for forming a second series. It can here be seen that the first four samples of the first series are correctly detected at the first sampling position SP1. However the fifth will be identified as a "zero" instead of a "one". The second series of samples taken at the second sampling position SP2, will also correctly identify the first four symbols. However, it will also correctly identify the fifth symbol. If this detection pattern is repeated throughout the pilot data section PDS of the signal, this therefore means that the second series will have a lower BER than the first series and the second sampling position PS2 may therefore get selected to be the operative sampling position instead of the first sampling position SP1.

Figure 7:
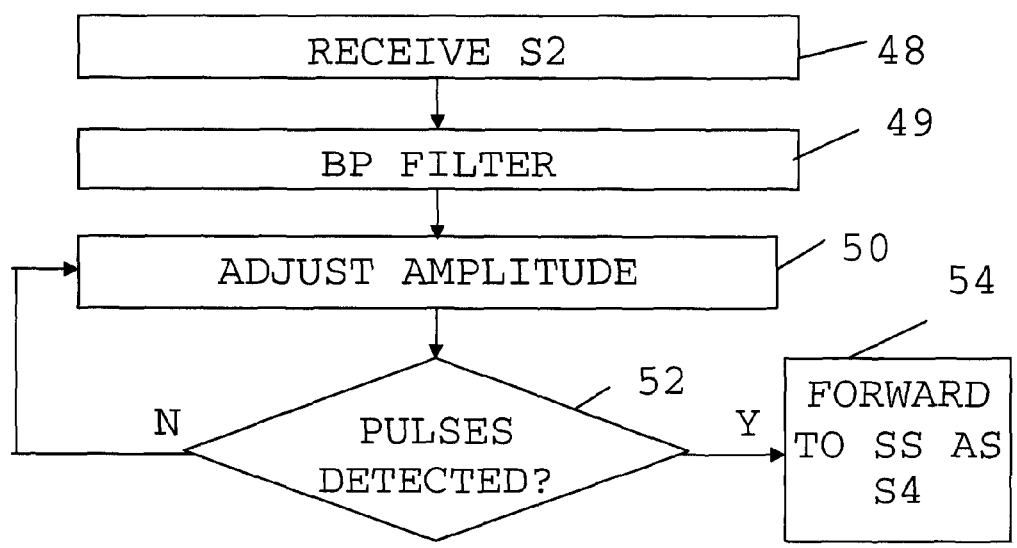
FIG. 7 shows a number of method steps for processing a received signal that is performed in a second and third embodiment of the method of handling a signal.
Figure 8:
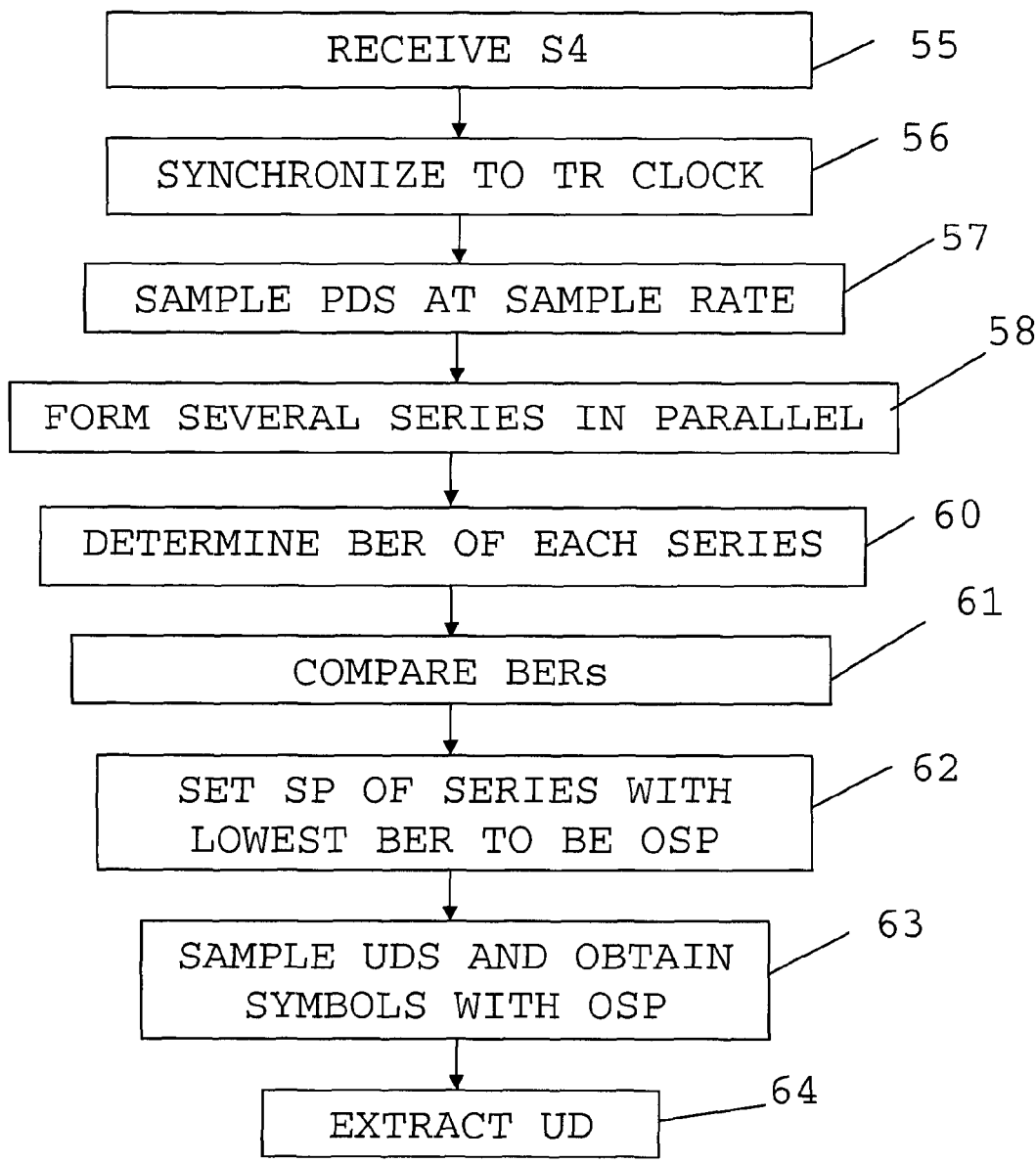
FIG. 8 shows a number of further method steps for processing a received signal that is performed in the second embodiment of the method of handling a signal.
Figure 9:
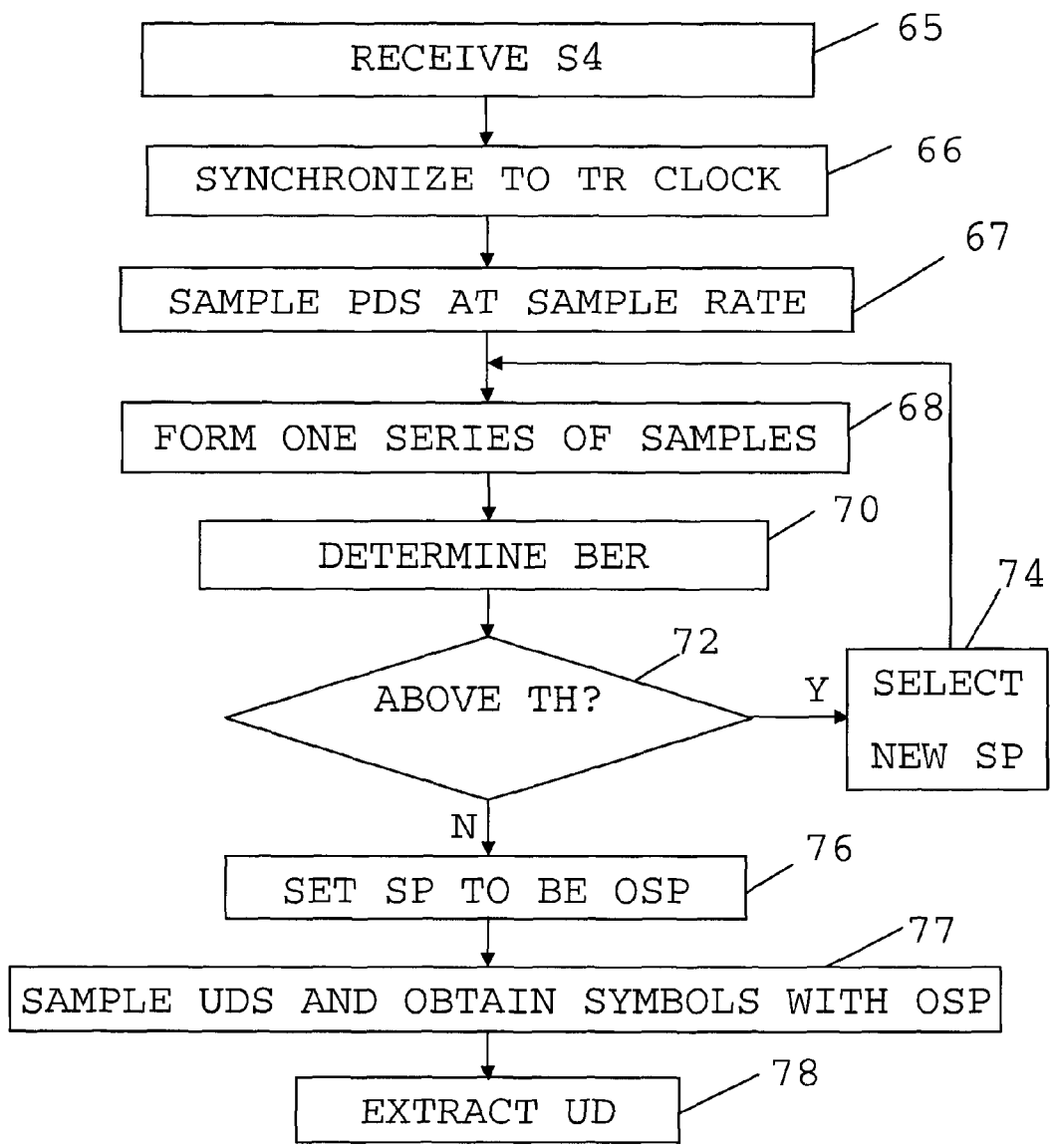
FIG. 9 shows a number of further method steps for processing a received signal that is performed in the third embodiment of the method of handling a signal.

Now a second and third embodiment of handling a data signal will be described with reference being made to FIG. 7, which shows a number of method steps for processing a received signal that are performed by the pulse investigator 34, to FIG. 8, which shows a number of method steps for processing a received signal that are performed in the second embodiment by the signal sampler 30 and the data analyser 32 and to FIG. 9, which shows a number of further method steps for processing a received signal that are performed in the third embodiment by the signal sampler 30 and the data analyser 32.

In these two embodiments a two level adaptive tuning is used for improving data decoding.

Just as in the first embodiment, the signal S2 is received at the second electrode 22, step 48. In the second and third embodiments it is then band pass filtered, in the filter 27, step 49. The filter is here set to let signal in the desirable band pass, for instance the band 5-10 MHZ or 20-40 MHz and block other frequencies.

After filtering the signal is forwarded to the amplifier 28, where it is amplified with a certain gain in order to obtain the amplified signal S3. The amplifier thus adapts the amplitude of the signal, step 50.

The data handling unit 24 should be able to detect the narrow pulse from human body and reconstruct it to a pulse with a proper duty cycle. In order to do this the amplified signal S3 is provided to the pulse shaper 29, where pulses are provided as the pulse shaped signal S4 in case they can be discerned after amplification. The pulse shaped signal S4 is then provided at the output of the pulse shaper 29. Here the pulse investigator 34 investigates if it can detect any pulses, i.e. if the pulse shaper 29 outputs pulses or not, step 52, and if the pulse investigator 34 can detect pulses these pulses are forwarded to the signal sampler 30 as the pulse shaped signal S4, step 54. However, if pulses cannot be detected, step 52, the pulse investigator 34 adjusts the gain of the amplifier 28 so that the amplitude of the received signal S2 is changed, step 50. The pulse investigator 34 may here increase the gain of the amplifier 28 so that the amplitude of the signal is raised and thus enabling the detection of pulses. It may however also lower the gain. Which type of change that is selected typically depends on the voltage level and duty cycle of the pulse shaper output.

Once pulses have been provided in this way, then these pulses of the pulse shaped signal S4 are forwarded to the signal sampler 30.

The amplifier gain is thus varied such that a pulse is obtained at the amplifier output, which may also be referred as a coarse tuning. Once a pulse is obtained a fine-tuning may then be performed, which may be needed because of varying amplification/attenuation for different frequency signals, which may be reflected in the duty cycle of the received Manchester encoded pulse.

According to the second embodiment of the invention the signal sampler 30 here thus receives the pulse shaped signal S4, step 55. Once this has been done, the signal shaper 30 then recovers the clock. In this embodiment of the invention the clock frequency of the body signal transmission device is known by the signal handling device. The clock rate is thus known. However, the transmission clock of the body signal transmission device 12 is not synchronized with the clock of the signal handling device 14. Therefore the signal sampler 30 synchronizes to the transmit clock, step 56, i.e. to the clock of the body signal transmission device 12. This synchronisation is performed through the signal sampler 30 using clock oversampling on the encoded streaming input to recover this baseband clock. Clock oversampling is the obtaining of signal samples at a sample rate that is higher than the known clock rate in the earlier described way. The clock oversampling may be used for finding a known transition edge to start a synchronous clock generator of the signal sampler 30. A sampling position coinciding with the transition edge may then be used for the start of this synchronisation. The signal sampler 30 may here only perform clock synchronization during the reception of the pre-amble. Clock synchronisation may then be disabled after a preamble of a packet is detected. Ideally, a ratio between the sample rate and the clock rate of two is enough for recovering the clock, but in order to be able to handle a variation in the duty-cycle of 25-75% for the streaming input signal and for increased precision in the recovered clock, a higher ratio may be desired. One way to synchronize the receiver clock is through the signal handling device first trying to match the preamble for at least 16 bits of alternate '1' and '0' to detect the presence of packet in the input stream. After a preamble is successfully detected, a delimiter of bit pattern '11' may be searched in a space of for instance 48 bits. If the bit pattern '11' is not detected, an error flag may be raised and the entire procedure restarted for preamble detection.

After the clock has been synchronized, then the signal sampler 30 continues and samples the pilot data section PDS at the high sample rate, step 57, i.e. also at an oversample rate, which may be same as or a different rate than the oversample rate used in the synchronisation, and then forms several series of samples in parallel, step 58, for instance one for each different sampling position that is possible to obtain because of the oversampling. There may thus be one or more parallel series of samples. In the example of FIG. 4 there are only two such sampling positions. Every series of samples provides a corresponding series of digital symbols and these digital symbols are then provided to the data analyser 32, where they are compared with the known symbols of the data sequence DS of the pilot data section PDS. BER is then determined based on this comparison. There is thus one BER determined or generated for each series and each sampling position, step 60. The data analyser then compares these BERs, step 61. The data analyser 32 thereafter selects a BER according to the data sequence detection criterion. In this second embodiment of the invention the criterion is to select the best BER. The data analyser 32 therefore sets the sampling position of the series with the lowest BER to be operative sampling position, step 62. The data analyser 32 then informs the signal sampler 30 of which sampling position is to be an operative sampling position and this operative sampling position is then used by the signal sampler 30 for sampling the signal S4 and obtaining symbols in the user data section UDS, step 63. The symbols are then forwarded from the signal sampler 30 to the decoding unit 26 where the signal is decoded, which involves extracting user data UD from the clock signal and CRC code, step 64.

According to the third embodiment, the operation in the signal sampler 30 and data analyser 32 is a bit different. Here the shaped signal S4 is received by the signal sampler 30, step 65, followed by clock synchronization, step 66, and sampling of the pilot data section PDS at the sample rate, step 67, in the same way as before. However in this embodiment there is initially only formed a first series of samples, step 68, for instance a series of samples obtained using a default or nominal sampling position according to customary practice, which may be the first sampling position SP1, typically at 75% of the symbol. Symbols are then determined and the series of symbols corresponding to the series of samples is forwarded to the data analyser 32, which goes on and compares them with the known data sequence and determines BER, step 70. BER is then compared, in the data analyser 32, with a threshold and if BER is below the threshold, step 72, then the sampling position is set to be operative sampling position, step 76, and then used for sampling data and detecting symbols in the signal sampler, step 77, which is followed by extracting user data from the symbols in the decoding unit 26, step 78. However, if BER is above the threshold, step 72, then a new sampling position is selected, and the signal sampler 30 is instructed to again form a series of samples, step 68, however using the new sampling position, which may be the second sampling position SP2. BER is then again determined, step 70, and compared with the threshold. This type of operation is then repeated until a sampling position is used which provides a BER that is below the threshold. It is in some rare situations possible that no series has a low enough BER. In this case it is possible that no operative sampling position is set, reception of data deemed to be impossible and no decoding of following user data performed. Alternatively it is possible that the operative sampling position is set based on a lowest BER. New attempts to set an operative sampling position will of course be made on possible following pilot data sections of the signal.

In the second and third embodiments clock oversampling is thus used. This more particularly involves counting the oversampled clocks between the transition edges of the Manchester encoded signal to get information about the transmitter clock period. Then, the encoded signal is sampled to decode the data. In this approach, the sample point for the decoder is determined based on the Bit-error rate (BER) calculated for different sample points. The advantages are that the time varying changes in the communicating channel as in the human body are accounted for to set an optimal sample point for the decoder.

As a human body is used as a channel for the signal, the transmission power has to be low and then Manchester coding is good to use. However, at the same time the communication needs to be narrowband communication in order to avoid interference from other communication techniques. This leads to the pulses being short. Furthermore, the transmission through the body and possible processing, such as filtering, also distorts the signal, especially with regard to duty cycle, which makes the signal hard to decode.

The oversampling and determination of operational sampling position of the present invention addresses this problem, especially the problem of obtaining good signal decoding at distorted duty cycles.

With the second embodiment there is provided a very fast determination of a best sampling position, however while requiring more processing resources. In the third embodiment a normally slower but more economical approach is used.

The signal sampler may be realized through a combination of transmission detectors, counters and comparators. The data analyser may be realised in the form of a processor with associated program memory including computer program code for performing the functionality of the data analyser. It should be realized that this unit may also be provided in the form of hardware, like for instance in the form of an Application Specific Integrated Circuit (ASIC).

There are several variations that are possible to make of the invention.

In a variation of the third embodiment, the forming of series of samples is made in parallel, i.e. simultaneously. However, the investigation of the series is performed sequentially.

It is also possible to add a multiplexer to the body signal transmission device and a demultiplexer to the signal handling device in order to combine several different types of data, such as for instance audio, electronic message or file transfer streams. It is also possible to combine a body signal transmission device and signal handling device into a common entity or apparatus set to communicate with another such common entity or apparatus via the body.

Another possible variation is to have a variable bit rate, in which case the signal handling device would also comprise elements for determining the clock frequency used by the body signal transmission device.

While the invention has been described in connection with what is presently considered to be most practical and preferred embodiments, it is to be understood that the invention is not to be limited to the disclosed embodiments and variations, but on the contrary, is intended to cover various modifications and equivalent arrangements. Therefore the invention is only to be limited by the following claims.

The invention claimed is:

1. A method of handling a signal transmitted through a human body, the signal being coded with a coding scheme and associated clock rate, the method being performed in a signal handling device and comprising:
   receiving, by a receiver, said signal,
   forwarding said received signal toward a signal sampler;
   sampling at least a section of the forwarded signal with a sample rate that is higher than the clock rate of the coding scheme,
   forming at least one series of samples of the forwarded signal, where the samples of a series have been sampled at a sampling position periodically recurring according to the clock rate,
   investigating if said at least one series fulfils a data sequence detection criterion, the data sequence detection criterion comprising one of a bit error rate or a packet error rate, and
   setting a sampling position for which a series of samples fulfils the data sequence detection criterion to be an operative sampling position, the operative sampling position comprising a position used in decoding data in the forwarded signal.

2. The method according to claim 1, wherein the investigating comprises determining the quality of reception of a known data sequence.

3. The method according to claim 1, wherein the forming comprises forming more than one series of samples and the sampling positions of each series differ from each other.

4. The method according to claim 3, where only one series fulfils the data sequence detection criterion.

5. The method according to claim 1, wherein the investigating comprises investigating one series of samples at a time, and the setting comprises setting a sampling position to be an operative sampling position if the corresponding series fulfils the data sequence detection criterion and otherwise repeating investigating series of samples until the data sequence detection criterion is fulfilled.

6. The method according to claim 1, further comprising obtaining symbols in the forwarded signal from signal samples obtained at the operative sampling position.

7. The method according to claim 6, further comprising extracting user data from the obtained symbols.

8. The method according to claim 7, wherein the extracting comprises performing a logical operation on the symbols for obtaining user data.

9. The method according to claim 1, further comprising:
   filtering the forwarded signal;
   investigating if the forwarded signal comprises pulses; and
   adjusting the amplitude of the forwarded signal until pulses are detected.

10. The method according to claim 1, wherein the signal is a Manchester encoded signal.

11. The method according to claim 1, wherein a frequency band of the received signal lies between 1-100 MHz.

12. The method according to claim 11, wherein the received signal is provided in one of two bands provided in the range.

13. A signal handling device for handling a signal transmitted through a human body, the signal being coded with a coding scheme and associated clock rate, the signal handling device comprising:
   a receiver configured to receive said signal and forward said signal toward a signal sampler,
   the signal sampler configured to:
      receive the forwarded signal;
      sample at least a section of the forwarded signal with a sample rate that is higher than the clock rate of the coding scheme, and
      form at least one series of samples of the forwarded signal, where the samples of a series have been sampled at a sampling position periodically recurring according to the clock rate, and
   data analyser circuitry configured to
      investigate if said at least one series fulfils a data sequence detection criterion, the data sequence detection criterion comprising one of a bit error rate or a packet error rate, and
      set a sampling position for which a series of samples fulfils the data sequence detection criterion to be an operative sampling position, the operative sampling position comprising a position used in decoding data in the forwarded signal.

14. The signal handling device according to claim 13, wherein the data analyser circuitry, when investigating a series, is configured to determine the quality of reception of a known data sequence.

15. The signal handling device according to claim 13, wherein the signal sampler is configured to form more than one series of samples where the sampling positions of each series differ from each other.

16. The signal handling device according to claim 15, where only one series fulfils the data sequence detection criterion.

17. The signal handling device according to claim 13, wherein said data analyser circuitry is configured to investigate one series of samples at a time and set a sampling position to be an operative sampling position if the corresponding series fulfils the data sequence detection criterion and otherwise to repeat investigating series of samples until the data sequence detection criterion is fulfilled.

18. The signal handling device according to claim 13, wherein the signal sampler is further configured to obtain symbols in the forwarded signal from signal samples obtained at the operative sampling position.

19. The signal handling device according to claim 18, further comprising decoding circuitry configured to extract user data (UD) from the obtained symbols.

20. The signal handling device according to claim 19, wherein the decoding circuitry is configured to perform a logical operation on the symbols for obtaining user data.

21. The signal handling device according to claim 13, further comprising:
- a band pass filter configured to filter the forwarded signal;
- an amplifier configured to amplify the forwarded signal from the band pass filter;
- a pulse investigator, said pulse investigator configured to:
  - investigate if the forwarded signal comprises a pulse;
  - adjust the gain of the amplifier until pulses are detected; and
- a pulse shaper configured to forward the amplified forwarded signal to the signal sampler.

* * * * *